United States Patent [19]
Sankaran et al.

[11] 4,367,329
[45] Jan. 4, 1983

[54] POLYAROMATIC AMIDES HAVING ACETYLENE GROUPINGS CURABLE BY DIELS-ALDER CYCLOADDITION

[75] Inventors: Venkatesa Sankaran, Wilmington, Del.; Carl S. Marvel, Tucson, Ariz.

[73] Assignee: The United States of America as represented by the Secretary of the Air Force, Washington, D.C.

[21] Appl. No.: 265,720

[22] Filed: May 20, 1981

[51] Int. Cl.³ .............................................. C08G 69/26
[52] U.S. Cl. .................................... 528/183; 528/337; 528/345; 528/348
[58] Field of Search ................ 528/345, 337, 348, 183

[56] References Cited

U.S. PATENT DOCUMENTS 3,325,850  6/1967  Angelo .................................... 260/47
3,840,635  10/1974  Shima et al. ......................... 264/236
4,097,456  6/1978  Barie ..................................... 260/47

Primary Examiner—Harold D. Anderson
Attorney, Agent, or Firm—Donald J. Singer; William J. O'Brien

[57] ABSTRACT

New processable polyaromatic amides were prepared from the acid chloride of bis-m-carboxyphenyl acetylene and several aromatic diamines. The polyamides containing the acetylene units were cured by Diels-Alder cycloaddition reaction with 1,4-diphenyl-1,3-butadiene. Cured polyamides showed increase in Tg. thermal and heat stabilities. The polyamides can be cast into films and give good glass fiber laminates.

10 Claims, No Drawings

POLYAROMATIC AMIDES HAVING ACETYLENE GROUPINGS CURABLE BY DIELS-ALDER CYCLOADDITION

STATEMENT OF GOVERNMENT INTEREST

The invention described herein may be manufactured and used by or for the Government for governmental purposes without the payment of any royalty thereon.

BACKGROUND OF THE INVENTION

This invention relates to a series of novel polymeric compounds and to a method for effecting their synthesis. In a more particular aspect, this invention relates to novel polyaromatic amides containing an acetylene moiety along the polymer chain.

Interest in laminates and laminating processes for use in a wide variety of industrial applications has increased considerably in the past few years. Glass fiber laminates, for example, find wide use as structural materials because of their lightweight, high relative strength, and high resistance to corrosion and other damaging effects encountered in an environment subject to extreme fluctuations in temperature and weather. Consequently, a concentrated research effort has evolved in an attempt to develop polymeric materials suitable for use as laminating resins. Such resins must possess a high degree of thermal stability and strength after curing coupled with good solubility characteristics before curing, if they are to be useful for impregnating and bonding the wide variety of laminate materials presently in use.

The research effort referred to above has culminated in the development of several resinous materials that have been found suitable from a stability and strength standpoint. Unfortunately, however, problems have arisen when using such materials due to the evolution of gas during the curing step which occurs after the laminate sheets are impregnated. The curing process which liberates gaseous side products has the deleterious effects of producing voids in the cured laminates which, in turn, substantially weakens the final laminated product.

It becomes obvious, therefore, that thermally stable laminating resins are needed that not only exhibit low melting points and good solubility before curing; but also can be cured without giving off volatile side products. The present invention, therefore, was directed toward providing a solution to the volatility problems previously encountered during the production and curing of laminated structures. As a consequence, it was found that the problems referred to above could be overcome by the development of novel polyaromatic amides curable by Diels-Alder cycloaddition. The resulting polymers contain substituted acetylene units on the polymer chain and not only exhibit good solubility and low melting points before cure coupled with good thermal stability heat and chemical resistance after cure; but are not subject to the liberation of gaseous side products during cure. These polyaromatic amides are susceptible to cure by way of a Diels-Alder cycloaddition reaction because of the functional group on the chain background. This results in an improved heat and chemically stable polymer particularly adapted for use as a laminating resin.

SUMMARY OF THE INVENTION

The present invention concerns itself with the synthesis of novel polyaromatic amides curable by Diels-Alder cycloaddition. These polymers find wide application as impregnants and bonding agents for laminated structures because of their particular properties. They not only possess the requisite solubility and low melting points; but, in addition, do not generate gaseous side products during cure which often contribute to the weakening of cured laminate structures. The synthesis of this invention is carried into effect by reacting an acid chloride of bis-m-carboxyphenyl acetylene and an aromatic diamine selected from the group consisting of p-diaminobenzene, m-diaminobenzene, 4,4'-oxydianiline and bis (4-aminobenzene) sulfone.

Accordingly, the primary object of this invention is to provide novel polyaromatic amides that are curable by Diels-Alder cycloaddition.

Another object of this invention is to provide a curable polymeric material that does not liberate gaseous side products during cure.

Still another object of this invention is to provide a novel polymerizable material that possess the requisite characteristics that make it especially useful as a resinous impregnant and bonding agent in the fabrication of laminated structures.

The above and still other objects and advantages of the present invention will become more readily apparent upon consideration of the following detailed description thereof.

DESCRIPTION OF THE PREFERRED EMBODIMENT

Pursuant to the above-defined objects, the present invention concerns itself with the synthesis of novel polyaromatic amides having an acetylene substituent positioned on the polymer chain. The novel polymers of this invention are illustrated by the following formula:

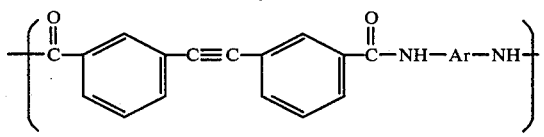

wherein Ar is a radical selected from the group consisting of

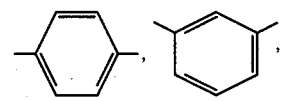

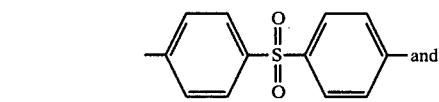

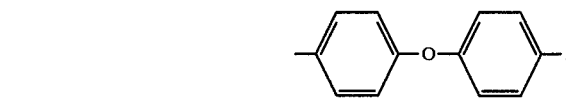

The compounds of this invention overcome the problems associated with curing processes which liberate gaseous side products during cure. This has the deleterious effect of producing voids which substantially weaken laminated structures. Hence, thermally stable laminating resins are needed that are not only low melting and moderately stable prior to curing, but also can be cured without giving off volatiles. Particularly promising in this respect are polymers containing a 1,4-diphenyl-1,3-butadiene as illustrated by the reaction scheme shown as follows in Table A.

TABLE A

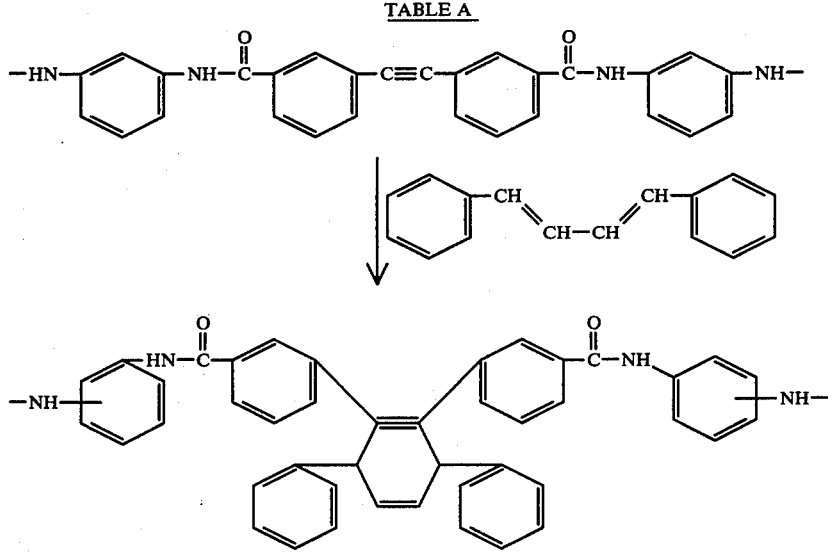

substituted acetylene moiety present in the backbone of the polymer chain.

Polymers containing cyclic structures like aromatic or heteroaromatic ring systems have good thermal stability and high heat resistance but are not easily processable. The problems in processability of cyclic structured polymers are due to their low solubility in solvents and high melting temperatures. Therefore, the present invention is aimed at preparing new processable polyaromatic amides with good solubility before curing and with improved thermal, heat and chemical resistances after curing.

A hot drawing technique is commonly used in the fabrication process of aromatic polyamides. During this process, the physical structure of the polymer changes to produce high heat and chemical resistances to the resultant polyamides. The same purpose can be achieved by introducing a functional group on the chain backbone which, on Diels-Alder cycloaddition reaction, produces an improved heat and chemically stable polymer.

The acid chloride of bis-m-carboxyphenyl acetylene used as a reactant in this invention was synthesized in a conventional manner. The monomer was polymerized with different aromatic diamines in dimethyl acetamide at 0° C. The resulting polyamides containing the acetylene moiety were then cured by cycloaddition with The cured polyamide showed increased Tg, thermal and heat stabilities.

The aromatic diamines used as the second reactant in this invention were prepared as follows. The m-Diaminobenzene, p-diaminobenzene and 4,4-oxydianiline were purified by sublimation, while bis-(4-aminobenzene) sulfone was purified by recrystallization from ether.

In the general procedure for preparing the polyamides of this invention, two millimoles of the aromatic diamine was dissolved in 10 ml of dry, N,N-dimethylacetamide (DMAC) in a 50 ml three necked flask fitted with a stirrer, dropping funnel and a nitrogen inlet. The solution was cooled to 0° C. and a stoichiometric quantity of the diacid chloride in 5 ml of DMAC was added to the vigorously stirred solution of diamine under nitrogen. The solution became viscous. After 3 hr. methanol was added and the precipitated polyamide was filtered and washed several times with methanol. The polymer was purified by dissolving in a small quantity of dimethyl formamide, precipitated by adding methanol, filtered, washed and dried at 100° C. in vacuo. The yields were over 90%. The polymers did not melt below 360° C.

Tables B and C which follow, disclose the structural formulas of four specific polyaromatic amides which come within the purview of this invention as well as their elementary analysis, aging, characteristics, softening temperature and glass transition temperature.

TABLE B

| | | Anal. Calcd. | | | | Found | | | |
|---|---|---|---|---|---|---|---|---|---|
| Polymer | Structure | % C | % H | % N | % S | % C | % H | % N | % S |
| P-I | (structure) | 78.10 | 4.14 | 8.28 | — | 74.48 | 4.17 | 8.08 | — |
| P-II | (structure) | 78.10 | 4.14 | 8.28 | — | 73.36 | 4.40 | 8.20 | — |

STRUCTURE AND ELEMENTARY ANALYSIS OF POLYAMIDES

TABLE B-continued
STRUCTURE AND ELEMENTARY ANALYSIS OF POLYAMIDES

| Polymer | Structure | Anal. Calcd. | | | | Found | | | |
|---|---|---|---|---|---|---|---|---|---|
| | | % C | % H | % N | % S | % C | % H | % N | % S |
| P-III | 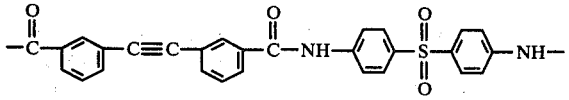 | 70.29 | 3.76 | 5.85 | 6.69 | 67.48 | 3.83 | 6.00 | 6.84 |
| P-IV | 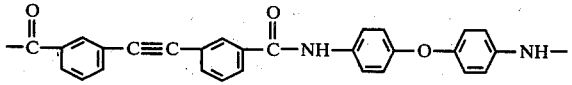 | 78.13 | 4.18 | 6.51 | — | 74.51 | 4.17 | 6.44 | — |

TABLE C

| Polymer | $n30°$ C. DMF + 5% LiCl | DSC Thermogram °C. | Softening Temperature (Vicat) | Isothermal Aging at 300° C. for 3 days % wt loss |
|---|---|---|---|---|
| P-I | (a) 0.24 | 186 | 294 | 5.1 |
| | (b) — | 193 | — | 1.1 |
| P-II | (a) 0.28 | 161 | 281 | 4.7 |
| | (b) — | 181 | — | 0.7 |
| P-III | (a) 0.24 | 167 | 230 | 6.2 |
| | (b) — | 172 | — | 1.3 |
| P-IV | (a) 0.18 | 157 | 217 | 7.1 |
| | (b) — | 161 | — | 1.2 |

In oxidative aging, the polyamides were heated in an air circulated oven at 300° C. for 3 days. The samples were weighed before and after aging and the percentage weight loss was determined. The softening temperature of the polymers before and after curing were measured with a Vicat-type apparatus under a load on the sample of 44 psi at a heating rate of 1° C./min, while the glass transition temperature (second order transition temperature) was measured using a Differential Scanning Calorimeter (Perkin-Elmer, DSC-1B) at slope 2, and range 8 with a scan speed of 10° C./min. The polyamides were purified by dissolving in a minimum amount of dimethyl formamide, precipitated with methanol, filtered, washed with methanol and dried at 100° C. in vacuum oven for 24 hr. Purified polyamides were soluble in dimethyl formamide containing 5% lithium chloride, dimethyl acetamide but were partially soluble in conc. sulfuric acid. The infrared spectrum showed absorption at 1660 cm$^{-1}$ for amide group. Elemental analysis of the polyamides gave correct analysis for hydrogen, nitrogen and sulfur, while analysis for carbon for polymers P-I to P-IV were lower than the expected theoretical value for some unknown reason. On combustion, these polymers did not leave any residue.

Surprisingly, the viscosities of the polyamides were low. Lowering the temperature or increasing the time of the polymerization did not improve the viscosity. DSC thermogram showed one peak for the polyamides, which did not increase very much after curing. After curing, no softening temperature was noticed below 500° C. The percentage weight loss of the sample before and after curing were quite low except for polymers P-III and P-IV. Though there was no trend in properties of the polyamides because of the structural contribution of the aromatic diamines, the polymer obtained from p-diaminobenzene proved to be the best in the series. The polyamide containing the oxydiphenyl group (P-IV) showed lower viscosity and thermal properties.

From an examination of the above-mentioned, it can be seen that the present invention provides a novel group of polyaromatic amides which can be used effectively as laminating resins in the fabrication of a variety of laminated structures. These polymers exhibit excellent thermal stability and strength after polymerization as well as an absence of the post cure gaseous voids which heretofore proved deleterious in the fabrication of laminated structures.

Also, it should be understood by those skilled in the art that various alterations and modifications of the present invention can be undertaken without altering the spirit thereof and that all such modifications as are encompassed within the scope of the appended claims are intended to be included herein.

What is claimed is:

1. A resinous polyaromatic amide having acetylene groups as integral units of the polymer chain and consisting essentially of recurring units having the following structural formula:

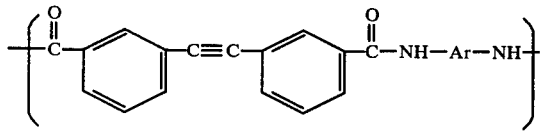

wherein Ar is a radical selected from the group consisting of

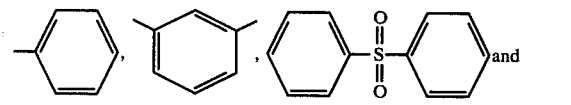

2. A polyaromatic amide in accordance with claim 1 wherein said Ar radical is

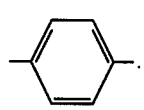

3. A polyaromatic amide in accordance with claim 1 wherein said Ar radical is

4. A polyaromatic amide in accordance with claim 1 wherein said Ar radical is

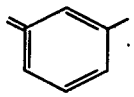

5. A polyaromatic amide in accordance with claim 1 wherein said Ar radical is

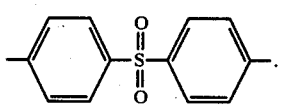

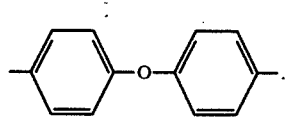

6. A method for synthesizing a resinous polyaromatic amide containing acetylene groups as integral units of the polymer chain which comprises the steps of (A) forming a reaction mixture between (1) the acid chloride of bis-m-carboxyphenyl acetylene and (2) an aromatic diamine selected from the group consisting of p-diaminobenzene, m-diaminobenzene, bis(4-aminobenzene) sulfone and 4,4-oxydianiline within an atmosphere of nitrogen maintained at a temperature of about 0° C; (B) allowing said mixture to react for a period of about three hours; and (C) separating the resultant polyaromatic amide reaction product.

7. A process in accordance with claim 6 wherein said diamine is p-diaminobenzene.

8. A process in accordance with claim 7 wherein said diamine is m-diaminobenzene.

9. A process in accordance with claim 7 wherein said diamine is bis(4-aminobenzene) sulfone.

10. A process in accordance with claim 7 wherein said diamine is 4,4'-oxydianiline.

* * * * *